(12) United States Patent
Fujimoto et al.

(10) Patent No.: US 7,344,802 B2
(45) Date of Patent: Mar. 18, 2008

(54) NONAQUEOUS ELECTROLYTE SECONDARY BATTERY

(75) Inventors: Hiroyuki Fujimoto, Kobe (JP); Toyoki Fujihara, Kobe (JP); Maruo Kamino, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 670 days.

(21) Appl. No.: 10/390,722

(22) Filed: Mar. 19, 2003

(65) Prior Publication Data
US 2003/0180617 A1 Sep. 25, 2003

(30) Foreign Application Priority Data
Mar. 22, 2002 (JP) ............... 2002-079944

(51) Int. Cl.
H01M 4/50 (2006.01)
H01M 4/52 (2006.01)
H01M 4/62 (2006.01)

(52) U.S. Cl. ............ 429/217; 429/231.1; 429/232

(58) Field of Classification Search ............ None
See application file for complete search history.

(56) References Cited

U.S. PATENT DOCUMENTS 6,497,979 B1 * 12/2002 Iijima et al. ............ 429/223
6,869,724 B2 * 3/2005 Suzuki et al. ............ 429/94
2002/0068218 A1 * 6/2002 Mao et al. ............ 429/223

FOREIGN PATENT DOCUMENTS

| CN | 1227424 A | 1/1999 |
|---|---|---|
| JP | 2561556 B2 | 9/1996 |
| JP | 11-176446 A | 7/1999 |
| JP | 3244314 B2 | 10/2001 |

OTHER PUBLICATIONS

Zhonghua, Lu, et al.; "Layered $Li[Ni_xCo_{1-2x}Mn_x]O_2$ Cathode Materials for Lithium-Ion Batteries"; *Electrochemical and Solid-State Letters*; pp. A200-A203; Oct. 5, 2001.

* cited by examiner

*Primary Examiner*—Jonathan Crepeau
(74) *Attorney, Agent, or Firm*—Kubovcik & Kubovcik

(57) ABSTRACT

A nonaqueous electrolyte secondary battery includes a positive electrode comprising a positive electrode material attached to a positive electrode current collector, a negative electrode and a nonaqueous electrolyte, wherein the positive electrode material comprises a positive electrode active material represented by $Li_aMn_bNi_bCo_{1-2b}O_2$ (wherein a is $0 \leq a \leq 1.1$, and b is $0 < b \leq 0.5$), a binder and an electrically conductive agent, wherein the binder is contained in the positive electrode material in a range of 0.8~3 weight %, and the density of the positive electrode material is not less than 3.0 g/cm$^3$.

2 Claims, 1 Drawing Sheet

NONAQUEOUS ELECTROLYTE SECONDARY BATTERY

FIELD OF THE INVENTION

The present invention relates to a nonaqueous electrolyte secondary battery that includes a positive electrode comprising a positive electrode material attached to a positive electrode current collector, a negative electrode and a nonaqueous electrolyte. Specifically, the present invention relates to an improvement of the positive electrode to increase high rate discharge characteristics of the nonaqueous electrolyte secondary battery.

BACKGROUND OF THE INVENTION

A nonaqueous secondary battery having a high electromotive force that comprises a nonaqueous electrolyte and utilizes oxidation and reduction of lithium has recently been used as one of new type high power and high energy batteries.

In such a nonaqueous electrolyte secondary battery, a lithium-transition metal composite oxide which lithium ions can be intercalated into and deintercalated from can be used as a positive electrode active material for a positive electrode. A lithium-cobalt composite oxide, $LiCoO_2$, is generally used.

However, cobalt, a material of a lithium-cobalt composite oxide, is expensive. Furthermore, in a nonaqueous electrode secondary battery comprising the lithium-cobalt composite oxide as a positive electrode active material, when lithium ions are deintercalated from the lithium-cobalt composite oxide an oxidation number of cobalt in the composite oxide becomes high, and the composite oxide reacts with the nonaqueous electrolyte. The reaction is vigorous when a temperature is high and causes various problems, for example, battery capacity of the nonaqueous electrolyte secondary battery is deteriorated.

A lithium-transition metal composite oxide containing a transition metal besides cobalt, for example, nickel, manganese, and the like, has been considered.

In Japanese Patent Nos. 2561556 and 3244314, a nonaqueous electrolyte secondary battery in which a lithium-transition metal composite oxide containing cobalt, nickel and manganese as a positive electrode active material is proposed. There is a report in Electrochemical and Solid-State Letters, 4(12)A200-A203 (2001) that if a lithium-transition metal composite oxide containing cobalt, nickel and manganese represented by $LiMn_xNi_xCo_{1-2x}O_2$, in which the mole ratios of manganese and nickel are the same, is used, reaction of the composite oxide with the nonaqueous electrolyte at a status of charge is inhibited and the battery has excellent heat stability.

However, when the lithium-transition metal composite oxide represented by the formula described above that contains manganese and nickel in equal mole ratios is used for a positive electrode active material, discharge characteristics of the positive electrode are deteriorated, especially when a battery is discharged at a large current discharge capacity is significantly reduced, and there is a problem that high rate discharge characteristics are not good.

To improve discharge characteristics of a positive electrode, Japanese Patent Laid-open Publication No. 11-176446 proposes to add a binder of a mixture of fibrillar carbon and granular carbon to a positive electrode active material. However, even when such binder is added, high rate discharge characteristics cannot be improved, sufficiently.

OBJECT OF THE INVENTION

An object of the present invention is to solve the above-described problems in a nonaqueous electrolyte secondary battery containing a lithium-transition metal composite oxide represented by the formula described above that contains manganese and nickel in equal mole ratios for a positive electrode active material. Specifically, it is an object of the present invention to obtain a sufficient discharge capacity when a battery is discharged at a large current.

SUMMARY OF THE INVENTION

To solve the above-described problems, a nonaqueous electrolyte secondary battery of the present invention contains a positive electrode in which a positive electrode material is attached to a positive electrode current collector, a negative electrode and a nonaqueous electrolyte, wherein the positive electrode material contains a positive electrode active material represented by $Li_aMn_bNi_bCo_{1-2b}O_2$ (wherein a is $0 \leq a \leq 1.1$, and b is $0 < b \leq 0.5$), a binder and an electrically conductive agent, wherein the binder is contained in the positive electrode material in a range of 0.8~3 weight %, and a density of the positive electrode material is not less than 3.0 g/cm$^3$.

EXPLANATION OF ELEMENTS

Figure 1:
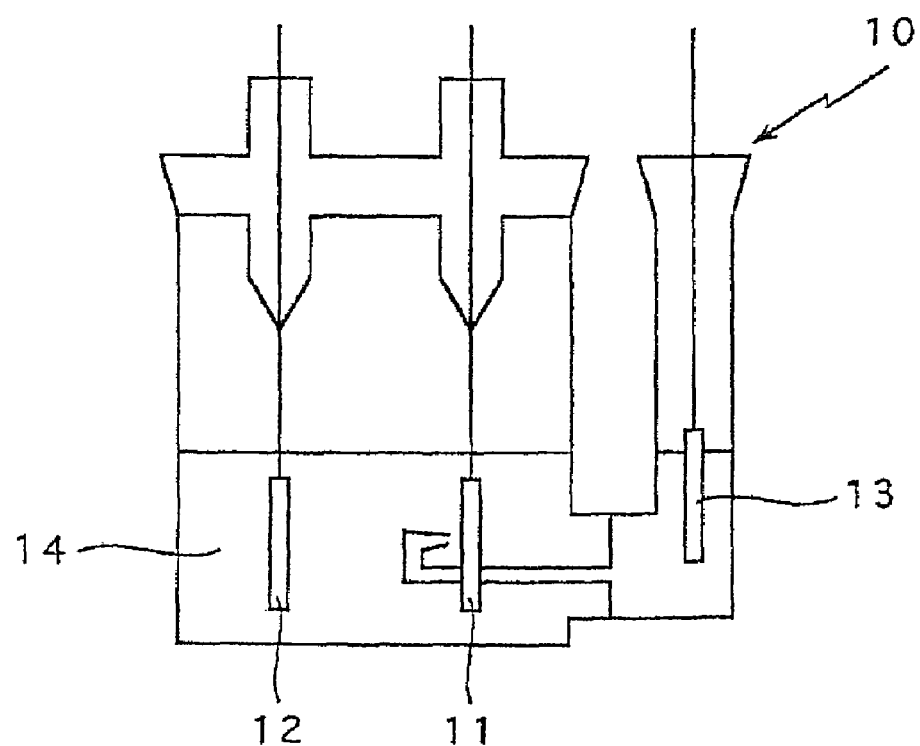
FIG. 1 is a drawing illustrating a test battery prepared in the Examples and the Comparative Examples.

10: test cell
11: working electrode (positive electrode)
12: counter electrode (negative electrode)
13: reference electrode
14: nonaqueous electrolyte

DETAILED EXPLANATION OF THE INVENTION

If a positive electrode active material represented by $Li_aMn_bNi_bCo_{1-2b}O_2$ is used for a nonaqueous electrolyte secondary battery, reaction of the positive electrode active material with a nonaqueous electrolyte is inhibited when the nonaqueous electrolyte secondary battery is charged.

If the binder is contained in the positive electrode material in a range of 0.8~3 weight %, and a density of the positive electrode material is not less than 3.0 g/cm$^3$, an efficient contact area of the particles of the positive electrode active material is provided to facilitate transfer of electrons in the positive electrode, and discharge characteristics of the positive electrode are improved. Sufficient discharge capacity can be obtained when the battery is discharged at a large current. If an amount of the binder is small, contact area of the particles of the positive electrode active material is increased, but if an amount of the binder is too small, adhesion of particles of the positive electrode active material to other particles or to a positive electrode current collector is decreased and exfoliation of the positive electrode active material particles easily occurs. Therefore, the binder should be contained in an amount of not less than 0.8 weight % in the positive electrode material.

In the nonaqueous electrolyte secondary battery of the present invention, a electrically conductive agent is included in the positive electrode material. The electrically conductive agent provides smooth transfer of electrons in the positive electrode to improve discharge characteristics of the positive electrode.

As an electrically conductive agent to be included in the positive electrode material, various known electrically conductive agents can be used. An amorphous carbon material, for example, acetylene black, ketjen black, and the like, is preferable to make electron transfer smooth in the positive electrode and to improve discharge characteristics of the positive electrode.

If an amount of the electrically conductive agent comprising a carbon material included in the positive electrode material is not sufficient, the above-described expected results cannot be obtained, but if an amount of the electrically conductive agent is excessive, a significant amount of the binder is used to adhere the electrically conductive agent and adhesion of the positive electrode active material particles to each other or to the positive electrode current collector is decreased and exfoliation of the positive electrode active material particles easily occurs. Therefore, the electrically conductive agent comprising a carbon material is preferably contained in a range of 1~3 weight % in the positive electrode material.

As a nonaqueous electrolyte to be used for a nonaqueous electrolyte secondary battery, conventionally used known nonaqueous electrolytes can be used.

As a solvent for the non-aqueous electrolyte, cyclic carbonates, for example, ethylene carbonate, propylene carbonate, butylene carbonate, and the like; chain carbonates, for example, dimethyl carbonate, ethylmethyl carbonate, diethyl carbonate, methylethyl carbonate, ethylpropyl carbonate, methylisopropyl carbonate, and the like; chain esters, for example, methyl acetate, ethyl acetate, propyl acetate, methyl propionate, ethyl propionate, and the like; cyclic carboxylates, for example, γ-butyrolactone, and the like; ethers, for example, tetrahydrofuran, 2-methyl tetrahydrofuran, 1,4-dioxane, 1,2-dimethoxyethane, 1,2-diethoxyethane, and the like; nitriles, for example, acetonitrile, and the like; amides, for example, dimethylformamide, and the like, can be used alone or in combinations thereof.

If a solvent mixture of the above-described cyclic carbonate and chain carbonate is used, if an amount of the cyclic carbonate is large, viscosity of the nonaqueous electrolyte is high, the nonaqueous electrolyte cannot penetrate into the positive electrode material having a density of 3.0 g/cm$^3$ or greater and discharge characteristics of the battery are deteriorated. Therefore, an amount of the cyclic carbonate is preferably not greater than 30 volume % in the solvent mixture.

A known solute can be used as a solute to be dissolved in the nonaqueous electrolyte. A lithium compound, for example, $LiPF_6$, $LiBF_4$, $LiClO_4$, $LiCF_3SO_3$, $LiAsF_6$, $LiN(CF_3SO_2)_2$, and the like can be illustrated.

A material known as a negative electrode active material can be used in the present invention. In addition to a lithium metal and a lithium alloy, for example, Li—Al, Li—In, Li—Sn, Li—Pb, Li—Bi, Li—Ga, Li—Sr, Li—Si, Li—Zn, Li—Cd, Li—Ca, Li—Ba, and the like, a carbon material, for example, graphite, coke, calcined organic substance, and the like, that are capable of occluding and releasing lithium ion, can be illustrated.

DESCRIPTION OF PREFERRED EMBODIMENT

Examples of a nonaqueous electrolyte secondary battery of the present invention are described below and are compared with comparative examples to show that a sufficient discharge capacity can be obtained when the battery of the present invention is discharged at a large current. It is of course understood that the present invention can be modified within the scope and spirit of the appended claims.

EXAMPLE 1

To prepare a positive electrode, LiOH and $Mn_{0.33}Ni_{0.33}Co_{0.33}(OH)_2$ were mixed at a mol ratio of 1:1 in a mortar with a pestle, the mixture was heated at 1000° C. for 20 hours in air, then was crushed to particles having an average diameter of about 5 μm to obtain a positive electrode active material represented by $LiMn_{0.33}Ni_{0.33}Co_{0.33}O_2$.

N-methylpyrrolidone was added to a positive electrode material comprising the positive electrode active material prepared above, acetylene black, which is an amorphous carbon material as an electrically conductive agent, and polyvinylidene fluoride as a binder in a ratio by weight of 94:3:3 and the mixture was kneaded to make a slurry.

Then the slurry was coated on a positive electrode current collector of an aluminum film having a thickness of 20 μm and dried, and was press rolled to prepare a positive electrode in which a positive electrode material having a density of 3.2 g/cm$^3$ was coated on the positive electrode current collector. An amount of the binder in the positive electrode material was 3 weight %.

In a test cell 10 as shown in FIG. 1, the positive electrode prepared above was used as a working electrode 11, and lithium metal was used for a counter electrode 12 and a reference electrode 13. A nonaqueous electrolyte 14 in which lithium hexafluorophospate ($LiPF_6$) was added in an amount of 1 mol/l to a solvent mixture of ethylene carbonate (EC) and diethyl carbonate (DEC) at a ratio by volume of 30:70 was used to prepare a test battery of Example 1.

EXAMPLE 2

A positive electrode was prepared in the same manner as the positive electrode in Example 1 except that the positive electrode was prepared by using a positive electrode material comprising the positive electrode active material prepared above, an amorphous carbon material of acetylene black as an electrically conductive agent and polyvinylidene fluoride as a binder in a ratio by weight of 95:3:2. A test cell of Example 2 was prepared in the same manner as Example 1. In the positive electrode used as the working electrode 11, the positive electrode material had a density of 3.2 g/cm$^3$ and contained a binder in an amount of 2 weight %.

EXAMPLE 3

A positive electrode was prepared in the same manner as the positive electrode in Example 1 except that the positive electrode was prepared by using a positive electrode material comprising the positive electrode active material prepared above, an amorphous carbon material of acetylene black as an electrically conductive agent and polyvinylidene fluoride as a binder in a ratio by weight of 96.2:3:0.8. A test cell of Example 3 was prepared in the same manner as Example 1. In the positive electrode used as the working electrode 11, the positive electrode material had a density of 3.2 g/cm$^3$ and contained a binder in an amount of 0.8 weight %.

COMPARATIVE EXAMPLE 1

A positive electrode was prepared in the same manner as the positive electrode in Example 1 except that the positive electrode was prepared by using a positive electrode material comprising the positive electrode active material prepared above, an amorphous carbon material of acetylene black as an electrically conductive agent and polyvinylidene fluoride as a binder in a ratio by weight of 93:3:4. A test cell of Comparative Example 1 was prepared in the same manner as Example 1. In the positive electrode used as the working electrode 11, the positive electrode material had a density of 3.2 g/cm$^3$ and contained a binder in an amount of 4 weight %.

COMPARATIVE EXAMPLE 2

A positive electrode was prepared in the same manner as the positive electrode in Example 1 except that the positive electrode was prepared by using a positive electrode material comprising the positive electrode active material prepared above, an amorphous carbon material of acetylene black as an electrically conductive agent and polyvinylidene fluoride as a binder in a ratio by weight of 92:3:5. A test cell of Comparative Example 2 was prepared in the same manner as Example 1. In the positive electrode used as the working electrode 11, the positive electrode material had a density of 3.2 g/cm$^3$ and contained a binder in an amount of 5 weight %.

COMPARATIVE EXAMPLE 3

A positive electrode was prepared in the same manner as the positive electrode in Example 1 except that the positive electrode was prepared by using a positive electrode material comprising the positive electrode active material prepared above, an amorphous carbon material of acetylene black as an electrically conductive agent and polyvinylidene fluoride as a binder in a ratio by weight of 96.5:3:0.5. A test cell of Comparative Example 3 was prepared in the same manner as Example 1. In the positive electrode used as the working electrode 11, the positive electrode material had a density of 3.2 g/cm$^3$ and contained a binder in an amount of 0.5 weight %.

A test battery of each of Examples 1~3 and Comparative Examples 1~3 was charged at a constant current of 1 mA/cm$^2$ to 4.3 V (vs. Li/Li$^+$) of the working electrode, and then was discharged at a constant current of 1 mA/cm$^2$ to 2.75 V (vs. Li/Li$^+$) of the working electrode to obtain a discharge capacity ($Q_L$) per weight (mAh/g) of each positive electrode active material during discharge at a small current.

Then each test battery was charged at a constant current of 1 mA/cm$^2$ to 4.3 V (vs. Li/Li$^+$) of the working electrode, and was discharged at a constant current of 6 mA/cm$^2$ to 2.75 V (vs. Li/Li$^+$) of the working electrode to obtain a discharge capacity ($Q_H$) per weight (mAh/g) of each positive electrode active material during discharge at a large current. A capacity ratio (%) (the discharge capacity ($Q_H$) during discharge at the large current relative to the discharge capacity ($Q_L$) during discharge at the small current), was calculated by the following formula, and the results are shown in Table 1.

$$\text{Capacity Ratio (\%)}=(Q_H/Q_L)\times 100$$

TABLE 1

| | Composition of Positive Electrode Material (weight %) | | | Density of Positive Electrode Material (g/cm$^3$) | Capacity Ratio (%) |
|---|---|---|---|---|---|
| | Positive Electrode Active Material | Conductive Agent | Binder | | |
| Example 1 | 94 | 3 | 3 | 3.2 | 85 |
| Example 2 | 95 | 3 | 2 | 3.2 | 84 |
| Example 3 | 96.2 | 3 | 0.8 | 3.2 | 81 |
| Comparative Example 1 | 93 | 3 | 4 | 3.2 | 65 |
| Comparative Example 2 | 92 | 3 | 5 | 3.2 | 60 |
| Comparative Example 3 | 96.5 | 3 | 0.5 | 3.2 | 62 |

As clear from the results, each test battery of Examples 1~3 having a positive electrode containing the binder in a range of 0.8~3 weight % in the positive electrode material, the capacity ratio was greater than that of the test battery of each of Comparative Examples 1~3 and even if the batteries were discharged at large current, sufficient discharge capacity was obtained.

EXAMPLE 4

A positive electrode was prepared from a positive electrode material comprising the positive electrode active material prepared above, an amorphous carbon material of acetylene black as an electrically conductive agent and polyvinylidene fluoride as a binder in a ratio by weight of 94:3:3 in the same manner as the positive electrode in Example 1 except that the positive electrode material was press rolled on a positive electrode current collector under conditions which provided a positive electrode material having a density of 3.1 g/cm$^3$. A test cell of Example 4 was prepared in the same manner as Example 1.

EXAMPLE 5

A positive electrode was prepared from a positive electrode material comprising the positive electrode active material prepared above, an amorphous carbon material of acetylene black as an electrically conductive agent and polyvinylidene fluoride as a binder in a ratio by weight of 94:3:3 in the same manner as the positive electrode in Example 1 except that the positive electrode material was press rolled on a positive electrode current collector under conditions which provided a positive electrode material having a density of 3.0 g/cm$^3$. A test cell of Example 5 was prepared in the same manner as Example 1.

COMPARATIVE EXAMPLE 4

A positive electrode was prepared from a positive electrode material comprising the positive electrode active material prepared above, an amorphous carbon material of acetylene black as an electrically conductive agent and polyvinylidene fluoride as a binder in a ratio by weight of 94:3:3 in the same manner as the positive electrode in Example 1 except that the positive electrode material was press rolled on a positive electrode current collector under conditions which provided a positive electrode material having a density of 2.9 g/cm$^3$. A test cell of Comparative Example 4 was prepared in the same manner as Example 1.

COMPARATIVE EXAMPLE 5

A positive electrode was prepared from a positive electrode material comprising the positive electrode active material prepared above, an amorphous carbon material of acetylene black as an electrically conductive agent and polyvinylidene fluoride as a binder in a ratio by weight of 94:3:3 in the same manner as the positive electrode in Example 1 except that the positive electrode material was press rolled on a positive electrode current collector under conditions which provided a positive electrode material having a density of 2.8 g/cm$^3$. A test cell of Comparative Example 5 was prepared in the same manner as Example 1.

A capacity ratio (%), i.e., discharge capacity ($Q_H$) during discharge at a large current relative to discharge capacity ($Q_L$) during discharge at a small current, of each test battery prepared in Examples 4 and 5 and Comparative Examples 4 and 5 was obtained in the same manner as Example 1. The results are shown in Table 2.

TABLE 2

| | Composition of Positive Electrode Material (weight %) | | | Density of Positive Electrode Material (g/cm$^3$) | Capacity Ratio (%) |
|---|---|---|---|---|---|
| | Positive Electrode Active Material | Conductive Agent | Binder | | |
| Example 1 | 94 | 3 | 3 | 3.2 | 85 |
| Example 4 | 94 | 3 | 3 | 3.1 | 83 |
| Example 5 | 94 | 3 | 3 | 3.0 | 84 |
| Comparative Example 4 | 94 | 3 | 3 | 2.9 | 69 |
| Comparative Example 5 | 94 | 3 | 3 | 2.8 | 67 |

As is clear from the results, test batteries of Examples 1, 4 and 5 having positive electrodes in which the positive electrode material had a density of 3.0 g/cm$^3$ or greater, had greater capacity ratios at the large current during discharge than those of test batteries of Comparative Examples 4 and 5 in which the positive electrode material had a density of less than 3.0 g/cm$^3$. Even when the batteries were discharged at the large current, sufficient discharge capacities were obtained.

EXAMPLE 6

A positive electrode was prepared in the same manner as the positive electrode in Example 1 except that the positive electrode was prepared using a positive electrode material comprising the positive electrode active material prepared above, an amorphous carbon material of acetylene black as an electrically conductive agent and polyvinylidene fluoride as a binder in a ratio by weight of 95:2:3. A test cell of Example 6 was prepared in the same manner as Example 1. In the positive electrode used as the working electrode 11, the positive electrode material had a density of 3.2 g/cm$^3$ and contained a conductive agent in an amount of 2 weight %.

EXAMPLE 7

A positive electrode was prepared in the same manner as the positive electrode in Example 1 except that the positive electrode was prepared using a positive electrode material comprising the positive electrode active material prepared above, an amorphous carbon material of acetylene black as an electrically conductive agent and polyvinylidene fluoride as a binder in a ratio by weight of 96:1:3. A test cell of Example 7 was prepared in the same manner as Example 1. In the positive electrode used as the working electrode 11, the positive electrode material had a density of 3.2 g/cm$^3$ and contained a conductive agent in an amount of 1 weight %.

EXAMPLE 8

A positive electrode was prepared in the same manner as the positive electrode in Example 1 except that the positive electrode was prepared using a positive electrode material comprising the positive electrode active material prepared above, an amorphous carbon material of acetylene black as an electrically conductive agent and polyvinylidene fluoride as a binder in a ratio by weight of 96.2:0.8:3. A test cell of Example 8 was prepared in the same manner as Example 1. In the positive electrode used as the working electrode 11, the positive electrode material had a density of 3.2 g/cm$^3$ and contained a conductive agent in an amount of 0.8 weight

EXAMPLE 9

A positive electrode was prepared in the same manner as the positive electrode in Example 1 except that the positive electrode was prepared using a positive electrode material comprising the positive electrode active material prepared above, an amorphous carbon material of acetylene black as an electrically conductive agent and polyvinylidene fluoride as a binder in a ratio by weight of 93:4:3. A test cell of Example 9 was prepared in the same manner as Example 1. In the positive electrode used as the working electrode 11, the positive electrode material had a density of 3.2 g/cm$^3$ and contained a conductive agent in an amount of 4 weight %.

A capacity ratio (%), i.e., discharge capacity ($Q_H$) during discharge at a large current relative to discharge capacity ($Q_L$) during discharge at a small current, of each test battery prepared in Examples 6~9 was obtained in the same manner as Example 1. The results are shown in Table 3.

TABLE 3

| | Composition of Positive Electrode Material (weight %) | | | Density of Positive Electrode Material (g/cm$^3$) | Capacity Ratio (%) |
|---|---|---|---|---|---|
| | Positive Electrode Active Material | Conductive Agent | Binder | | |
| Example 1 | 94 | 3 | 3 | 3.2 | 85 |
| Example 6 | 95 | 2 | 3 | 3.2 | 87 |
| Example 7 | 96 | 1 | 3 | 3.2 | 81 |
| Example 8 | 96.2 | 0.8 | 3 | 3.2 | 75 |
| Example 9 | 93 | 4 | 3 | 3.2 | 78 |

As is clear from the results, test batteries of Examples 6~9 containing various amounts of the conductive agent in the positive electrode material had greater capacity ratios at the large current during discharge than those of test batteries of the Comparative Examples. Even when the batteries were discharged at the large current, sufficient discharge capacities were obtained.

The test batteries of Examples 1, 6 and 7 using the positive electrodes containing the conductive agent in a range of 1~3 weight % in the positive electrode material had greater capacity ratios as compared to the batteries of Examples 8 and 9 using the positive electrodes containing an amount of the conductive agent out of the above range. In the test batteries of Examples 1, 6 and 7, when the batteries were discharged at a high current, further improved discharge capacities were obtained.

EXAMPLES 10~13

Test batteries of Example 10~13 were prepared in the same manner as Example 1 except that the solvent for the nonaqueous electrolyte 14 was a solvent mixture of ethylene carbonate (EC) and diethyl carbonate (DEC) at a ratio by volume of 20:80 in Example 10, 10:90 in Example 11, 40:60 in Example 12 and 50:50 in Example 13.

A capacity ratio (%), i.e., discharge capacity ($Q_H$) during discharge at a large current relative to discharge capacity ($Q_L$) during discharge at a small current, of each test battery prepared in Examples 10~13 was obtained in the same manner as Example 1. The results are shown in Table 4.

TABLE 4

| | Composition of Solvent Mixture | | Capacity Ratio |
|---|---|---|---|
| | EC | DEC | (%) |
| Example 1 | 30 | 70 | 85 |
| Example 10 | 20 | 80 | 87 |
| Example 11 | 10 | 90 | 84 |
| Example 12 | 40 | 60 | 78 |
| Example 13 | 50 | 50 | 77 |

As is clear from the results, test batteries of Examples 10~13 using various ratios of ethylene carbonate (EC) and diethyl carbonate (DEC) as the solvent for the nonaqueous electrolyte 14 had a greater capacity ratio at the large current during discharge than test batteries of the Comparative Examples. When the test batteries of Examples 10~13 were discharged at a large current, sufficient discharge capacities were obtained.

The test batteries of Examples 1, 10 and 11 in which ethylene carbonate (EC) was used in a range of not greater than 30 volume % in the mixture of ethylene carbonate (EC) and diethyl carbonate (DEC) as the solvent for the nonaqueous electrolyte 14 had further improved capacity ratios as compared to Examples 12 and 13 in which an amount of ethylene carbonate (EC) was more than 30 volume %. When the test batteries of Examples 1, 10 and 11 were discharged at a large current, further improved discharge capacities were obtained.

EXAMPLE 14

A positive electrode active material was prepared in the same manner as Example 1 except that LiOH and $Mn_{0.4}Ni_{0.4}Co_{0.2}(OH)_2$ were mixed at a mol ratio of 1:1 and a positive electrode active material represented by $LiMn_{0.4}Ni_{0.4}Co_{0.2}O_2$ was prepared.

A positive electrode was prepared in the same manner as Example 1 except that the positive electrode active material prepared above was used, and a test battery of Example 14 was prepared using the positive electrode as a working electrode 11.

EXAMPLE 15

A positive electrode active material was prepared in the same manner as Example 1 except that LiOH and $Mn_{0.5}Ni_{0.5}(OH)_2$ were mixed at a mol ratio of 1:1 and a positive electrode active material represented by $LiMn_{0.5}Ni_{0.5}O_2$ was prepared.

A positive electrode was prepared in the same manner as Example 1 except that the positive electrode active material prepared above was used, and a test battery of Example 15 was prepared using the positive electrode as a working electrode 11.

A capacity ratio (%), i.e., discharge capacity ($Q_H$) during discharge at a large current relative to discharge capacity ($Q_L$) during discharge at a small current, of each test battery prepared in Examples 14 and 15 was obtained in the same manner as Example 1. The results are shown in Table 5.

TABLE 5

| | Positive Electrode Active Material | Capacity Ratio (%) |
|---|---|---|
| Example 1 | $LiMn_{0.33}Ni_{0.33}Co_{0.33}O_2$ | 85 |
| Example 14 | $LiMn_{0.4}Ni_{0.4}Co_{0.2}O_2$ | 83 |
| Example 15 | $LiMn_{0.5}Ni_{0.5}O_2$ | 82 |

The positive electrode active material used in Examples 14 and 15 are also represented by formula $Li_aMn_bNi_bCo_{1-2b}O_2$ (wherein a is $0 \leq a \leq 1.1$, and b is $0 < b \leq 0.5$). The test batteries of Examples 14 and 15 had greater capacity ratios at the large current during discharge as compared to the Comparative Examples, and had sufficient discharge capacities when the batteries were discharged at the large current.

ADVANTAGES OF THE INVENTION

As described in detail above, a nonaqueous electrolyte secondary battery has improved discharge characteristics of a positive electrode and sufficient discharge capacity can be obtained even if the battery is discharged at a large current because efficient contact area of the positive electrode active material particles with each other is increased when the positive electrode material comprises a positive electrode active material represented by $Li_aMn_bNi_bCo_{1-2b}O_2$, a binder and an electrically conductive agent wherein the binder is contained in a range of 0.8~3 weight % and a density of the positive electrode material is 3.0 g/cm$^3$ or more.

As the result of using the positive electrode active material represented by $Li_aMn_bNi_bCo_{1-2b}O_2$ for a positive electrode of the nonaqueous electrolyte secondary battery of the present invention, the positive electrode active material is inhibited to react with the nonaqueous electrolyte when the battery is charged.

What is claimed is:

1. A nonaqueous electrolyte secondary battery comprising a positive electrode comprising a positive electrode material on a positive electrode current collector, a negative electrode and a nonaqueous electrolyte, wherein the positive electrode material comprises a positive electrode active material represented by $Li_aMn_bNi_bCo_{1-2b}O_2$ (wherein a is $0 \leq a \leq 1.1$, and b is $0 < b \leq 0.5$), a polyvinylidene fluoride binder and an amorphous carbon electrically conductive agent, wherein the binder is contained in the positive electrode material in a range of 0.8~3 weight %, the electrically conductive agent is contained in a range of 1~3 weight % in the positive electrode material and a density of the positive electrode material is 3.0 g/cm$^3$ or more.

2. The nonaqueous electrolyte secondary battery according to claim 1, wherein the nonaqueous electrolyte comprises a mixed solvent of a cyclic carbonate and a chain carbonate, where the cyclic carbonate is contained in an amount of 30 volume % or less in the mixed solvent.

* * * * *